(12) United States Patent
Bennett et al.

(10) Patent No.: US 10,374,402 B2
(45) Date of Patent: *Aug. 6, 2019

(54) WIRE PULLING HEAD APPARATUS WITH CRIMP ZONE INDICATORS AND METHOD OF USING SAME

(71) Applicant: Encore Wire Corporation, McKinney, TX (US)

(72) Inventors: Mark D. Bennett, Bonham, TX (US); William T. Bigbee, Jr., Melissa, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,765

(22) Filed: Feb. 20, 2018

(65) Prior Publication Data

US 2018/0175594 A1 Jun. 21, 2018

Related U.S. Application Data

(63) Continuation of application No. 15/359,065, filed on Nov. 22, 2016, now Pat. No. 9,923,345, which is a continuation of application No. 13/408,586, filed on Feb. 29, 2012, now Pat. No. 9,537,293.

(51) Int. Cl.
*H02G 1/08* (2006.01)
*H02G 3/00* (2006.01)

(52) U.S. Cl.
CPC ............... *H02G 1/081* (2013.01); *H02G 1/08* (2013.01); *H02G 3/00* (2013.01)

(58) Field of Classification Search
CPC ............ H02G 1/00; H02G 1/08; H02G 1/088; H02G 3/00
See application file for complete search history.

(56) References Cited

U.S. PATENT DOCUMENTS

| | | |
|---|---|---|
| 631,747 A | 8/1899 | Lloyd |
| 1,573,737 A | 2/1926 | Norman |
| 1,672,324 A | 6/1928 | Kepler |
| 1,819,430 A | 8/1931 | Martin et al. |

(Continued)

FOREIGN PATENT DOCUMENTS

| | | |
|---|---|---|
| WO | 9405929 | 3/1994 |
| WO | 9742531 | 11/1997 |

(Continued)

OTHER PUBLICATIONS

Condux.com, "Engineer to Order Products", printed via the web on Nov. 23, 2010, pp. 1-3.

*Primary Examiner* — Lee D Wilson
(74) *Attorney, Agent, or Firm* — Warren Rhoades LLP

(57) ABSTRACT

An enhanced apparatus and method for securing a wire to a pulling cable for pulling wire. Specifically, the pulling cable and wire are attached via a pulling head body. The wire is inserted into an end of the pulling head body and secured by crimping the pulling head body against the wire. Further, crimp zone indicators positioned on the outer surface of the pulling head body indicate the optimal zone of crimping to achieve substantial contact between the pulling head body and the wire. A pulling cable is secured to the pulling head body via a ball swage that comprises a tapped surface.

20 Claims, 9 Drawing Sheets

(56) References Cited

U.S. PATENT DOCUMENTS

| | | |
|---|---|---|
| 1,853,681 A | 4/1932 | Hayes |
| 1,994,674 A | 3/1935 | Van Inwagen, Jr. |
| 2,017,625 A | 10/1935 | Kellems |
| 2,040,992 A | 5/1936 | Harris |
| 2,247,041 A | 6/1941 | Bergan |
| 2,251,189 A | 7/1941 | Jensen |
| 2,327,831 A | 8/1943 | Sutton |
| 2,339,671 A | 1/1944 | Bergman |
| 2,509,115 A | 5/1950 | Wait et al. |
| 2,532,504 A | 12/1950 | Lapsley |
| 2,587,095 A | 2/1952 | Bergan |
| 2,615,074 A | 10/1952 | Bronovicki |
| 2,629,921 A | 3/1953 | Gray |
| 2,650,400 A | 9/1953 | Kellems |
| 2,657,371 A | 10/1953 | Huston |
| 2,668,280 A | 2/1954 | Dupre |
| 2,712,953 A | 7/1955 | Snow |
| 2,740,178 A | 4/1956 | Kellems |
| 2,766,501 A | 10/1956 | Kellems |
| 2,901,822 A | 9/1959 | Hayden |
| 3,048,908 A | 8/1962 | Bryan |
| 3,089,567 A | 5/1963 | Sullivan |
| 3,100,924 A | 8/1963 | Trier et al. |
| 3,102,715 A | 9/1963 | Weitzel et al. |
| 3,122,806 A | 3/1964 | Lewis |
| 3,137,765 A | 6/1964 | Lanum |
| 3,156,449 A | 11/1964 | Ensley |
| 3,346,284 A | 10/1967 | Petersen et al. |
| 3,522,961 A | 8/1970 | Cave, Sr. et al. |
| 3,551,959 A | 1/1971 | Mastalski |
| 3,570,074 A | 3/1971 | Schimmeyer et al. |
| 3,672,006 A | 6/1972 | Fidrych |
| 3,675,898 A | 7/1972 | Fattor et al. |
| 3,697,188 A | 10/1972 | Pope |
| 3,716,894 A | 2/1973 | Kingston et al. |
| 3,727,967 A | 4/1973 | Anatasiu et al. |
| 3,784,860 A | 1/1974 | Cocks |
| 3,858,848 A | 1/1975 | MacFetrich |
| 3,898,011 A | 8/1975 | Linguist et al. |
| 3,906,619 A | 9/1975 | Shaffer |
| 3,909,886 A | 10/1975 | Hocke |
| 3,979,106 A | 9/1976 | Jaques |
| 3,989,400 A | 11/1976 | Smith et al. |
| 3,999,253 A | 12/1976 | Hoadley |
| 4,078,767 A | 3/1978 | Battaglia |
| 4,101,114 A | 7/1978 | Martin et al. |
| 4,123,133 A | 10/1978 | Pickett et al. |
| 4,171,123 A | 10/1979 | Woelkers |
| 4,183,692 A | 1/1980 | Durr |
| 4,195,798 A | 4/1980 | Costantino |
| 4,293,157 A | 10/1981 | Fidrych |
| 4,337,923 A | 7/1982 | Smith |
| 4,368,910 A | 1/1983 | Fidrych |
| 4,403,667 A | 9/1983 | Reichman et al. |
| 4,411,409 A | 10/1983 | Smith |
| 4,419,534 A | 12/1983 | Dwyer |
| 4,432,663 A | 2/1984 | Lasak et al. |
| 4,453,291 A | 6/1984 | Fidrych |
| 4,460,159 A | 7/1984 | Charlesbois et al. |
| 4,461,059 A | 7/1984 | Bury |
| 4,552,338 A | 11/1985 | Lindgren |
| 4,563,032 A | 1/1986 | Knowles |
| 4,601,507 A | 7/1986 | Fallon |
| 4,635,989 A | 1/1987 | Tremblay et al. |
| 4,678,360 A | 7/1987 | Miller |
| 4,684,161 A | 8/1987 | Egner et al. |
| 4,684,211 A | 8/1987 | Weber et al. |
| 4,691,988 A | 9/1987 | Tremblay et al. |
| 4,736,978 A | 4/1988 | Ciekier |
| 4,796,347 A | 1/1989 | Aguillen, Jr. et al. |
| 4,847,447 A | 7/1989 | Eiswirth et al. |
| 4,969,677 A | 11/1990 | Melegari |
| 5,013,125 A | 5/1991 | Nilsson et al. |
| 5,039,196 A | 8/1991 | Nilsson |
| 5,067,843 A | 11/1991 | Nova |
| 5,122,007 A | 6/1992 | Smith |
| 5,129,027 A | 7/1992 | Boero et al. |
| 5,133,583 A | 7/1992 | Wagman et al. |
| 5,192,144 A | 3/1993 | Doninger |
| 5,231,752 A | 8/1993 | Hereford |
| 5,283,930 A | 2/1994 | Krauss |
| 5,289,613 A | 3/1994 | Kohl |
| 5,310,294 A | 5/1994 | Perkins |
| 5,480,203 A | 1/1996 | Favalora et al. |
| 5,582,447 A | 12/1996 | Leon et al. |
| D386,052 S | 11/1997 | Nassir |
| D390,763 S | 2/1998 | Nassir |
| 5,807,026 A | 9/1998 | Valette |
| 5,863,083 A | 1/1999 | Giebel et al. |
| 5,938,181 A | 8/1999 | Holden |
| 6,193,216 B1 | 2/2001 | Holen et al. |
| 6,193,217 B1 | 2/2001 | Zimmer |
| 6,266,469 B1 | 7/2001 | Roth |
| 6,278,823 B1 | 8/2001 | Goldner |
| 6,352,112 B1 | 3/2002 | Mills |
| 6,396,993 B1 | 5/2002 | Giebel et al. |
| 6,398,422 B1 | 6/2002 | Szilagyi et al. |
| 6,719,274 B2 | 4/2004 | Bowling |
| 6,786,473 B1 | 9/2004 | Alles |
| 6,883,782 B2 | 4/2005 | Ames et al. |
| 6,974,169 B1 | 12/2005 | Upton |
| 6,993,237 B2 | 1/2006 | Cooke et al. |
| 7,128,306 B2 | 10/2006 | Ames et al. |
| 7,175,160 B2 | 2/2007 | Diggle, III et al. |
| 7,246,789 B2 | 7/2007 | Ames et al. |
| 7,360,342 B2 | 4/2008 | Hayes et al. |
| D571,735 S | 6/2008 | Scherer et al. |
| D572,201 S | 7/2008 | Scherer et al. |
| 7,478,794 B1 | 1/2009 | Gohlke et al. |
| D635,450 S | 4/2011 | Deese |
| D686,061 S | 7/2013 | Daniel et al. |
| 8,800,967 B2 | 8/2014 | Carlson et al. |
| 8,973,235 B2 | 3/2015 | Henderson et al. |
| 9,537,293 B2* | 1/2017 | Bennett ............... H02G 1/081 |
| 9,923,345 B2* | 3/2018 | Bennett ............... H02G 1/081 |
| 2004/0041136 A1 | 3/2004 | Ames et al. |
| 2005/0001429 A1 | 1/2005 | Abercrombie et al. |
| 2007/0177707 A1 | 8/2007 | Rawdon |
| 2009/0070966 A1 | 3/2009 | Gohlke et al. |
| 2009/0224220 A1 | 9/2009 | Jordan et al. |
| 2010/0072440 A1 | 3/2010 | Wright |
| 2010/0176357 A1 | 7/2010 | Wen |
| 2010/0202748 A1 | 8/2010 | Pierce et al. |
| 2010/0258771 A1 | 10/2010 | White |
| 2011/0133141 A1 | 6/2011 | Carlson |
| 2012/0193088 A1 | 8/2012 | Benzie et al. |
| 2013/0221298 A1* | 8/2013 | Bennett ............... H02G 1/081 |
| | | 254/134.3 FT |
| 2017/0077685 A1* | 3/2017 | Bennett ............... H02G 1/081 |
| 2018/0175594 A1* | 6/2018 | Bennett ............... H02G 1/081 |

FOREIGN PATENT DOCUMENTS

| | | |
|---|---|---|
| WO | 0034117 | 6/2000 |
| WO | 0161813 | 8/2001 |
| WO | 0237632 | 5/2002 |
| WO | 03043154 | 5/2003 |
| WO | 2006021055 | 3/2006 |
| WO | 2008036994 | 4/2008 |
| WO | 2009108594 | 9/2009 |
| WO | 2009111659 | 9/2009 |
| WO | 2010105674 | 9/2010 |

* cited by examiner

WIRE PULLING HEAD APPARATUS WITH CRIMP ZONE INDICATORS AND METHOD OF USING SAME

CROSS-REFERENCE TO RELATED APPLICATIONS

This application is a continuation of U.S. patent application Ser. No. 15/359,065, filed Nov. 22, 2016, now Issued as U.S. Pat. No. 9,923,345, issued on Mar. 20, 2018, which is a continuation of U.S. patent application Ser. No. 13/408,586 filed Feb. 29, 2012, now Issued as U.S. Pat. No. 9,537,293, issued Jan. 3, 2017, both of which are herein incorporated in their entirety by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to pulling head bodies for pulling wires, and more particularly, to wire pulling head bodies having crimp zone indicators for facilitating proper crimping of the pulling head body onto the wire.

2. Description of Related Art

To distribute electricity throughout a building, insulated electrical wires are installed between the power source and power distribution box and routed to electrical boxes to supply electricity to a device. Often, these electrical wires are routed through multiple conduits throughout the building, and these conduits can span great distances and can include numerous twists and turns. As such, installing electrical wires throughout a building has presented both logistical and mechanical challenges.

The wire and cable industry have used many means for pulling wire through the building's infrastructure. For example, electric-powered machines have been used to pull the wires through the various conduits of the building's infrastructure. These wire pulling machines pulled wire through the building by applying a pulling tension to a pulling cable that was linked to the electrical wire. The pulling cable and wire were linked via a pulling head body. The pulling cable was attached to one end of the pulling head body, and the wire was secured to the opposite end of the pulling head body. To secure the wire to the pulling head body, an operator would insert the wire into the pulling head body and would use a crimping device to crimp the pulling head body against the wire.

During the crimping process, the position of the crimp on the pulling head body was estimated by the operator. For example, in some instances the operator would use a measuring device to determine where to crimp the pulling head onto the wire. In other instances, the operator would visually estimate the correct crimping position. Because of these crude techniques, often times an operator would place the crimp too close to the pulling cable side of the pulling head body. Sometimes, the result was that the crimp did not make enough contact between the pulling head body and the wire, and the wire would become detached from the cable during pulling. Alternatively, in some cases, the operator placed the crimp too close to the wire side of the pulling head body. The result was a weak crimp due to its close proximity to the end of the pulling head body. Again, the effect was the detachment of the wire from the pulling cable during a wire pull.

Inconsistent crimping resulted in pulling failures during a costly wire pull, loss of time, costs involved reattaching the wire to the pulling head, and the repeat of the process often many times before complete success. Although the crimps were occasionally properly positioned, the crimping procedure and sufficiency of engagement was at best inconsistent, time intensive, and required actual measuring of distances for crimp position by use of a separate device.

In addition, another potential point of failure occurred at the attachment between the pulling cable and the pulling head body. The pulling cable was attached to the pulling head body by some form of attachment means. During some wire pulls, the attachment means would fail, and the pulling cable would become detached from the wire.

Thus, there is need in the art for a more precise method of crimping a pulling head body to a wire to ensure that the wire remains secured to the pulling cable during a wire pull. What is needed is a pulling head body that enables a user to quickly and easily identify consistent and proper crimp zones, by way of a surface marking system, for providing proper attachment of a pulling head to a wire, all without the use of additional measuring devices or the need to reaccomplish the crimping procedure with additional devices and equipment. Furthermore, there is need for a more secure connection between the pulling cable and the pulling head body to prevent the pulling cable from detaching from the wire. What is needed is an attachment means designed with an improved grip to prevent the pulling cable from detaching from the pulling head body.

SUMMARY OF THE INVENTION

The present disclosure is directed to apparatuses and methods for pulling wire. In one preferred embodiment, a wire is linked to a pulling cable via a pulling head body. The pulling head body comprises one or more crimp zone indicators on the outer surface of the pulling head body. The crimp zone indicators indicate the approximately optimal position for crimping the pulling head body against a wire.

In another embodiment of the invention, a pulling cable is secured to the pulling head body via a ball swage that engages with the inner surface of the pulling head body. The ball swage is crimped to the end of the pulling cable, and the inner surface of the ball swage is tapped to increase friction between the ball swage and the pulling cable.

A further embodiment of the invention comprises a method for linking a pulling cable to a pulling wire. A pulling cable is inserted into a first end of a pulling head body. A ball swage is crimped to the end of the pulling cable such that when tension is applied to the pulling cable the ball swage engages with an inner surface of the pulling head body. A wire is inserted into a second end of the pulling head body. Using a crimping device, an operator secures the wire to the pulling head body by crimping the pulling head body against the wire such that the position of the crimp dimples are substantially centered with respect to one or more crimp zone indicators positioned on the outer surface of the pulling head body.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
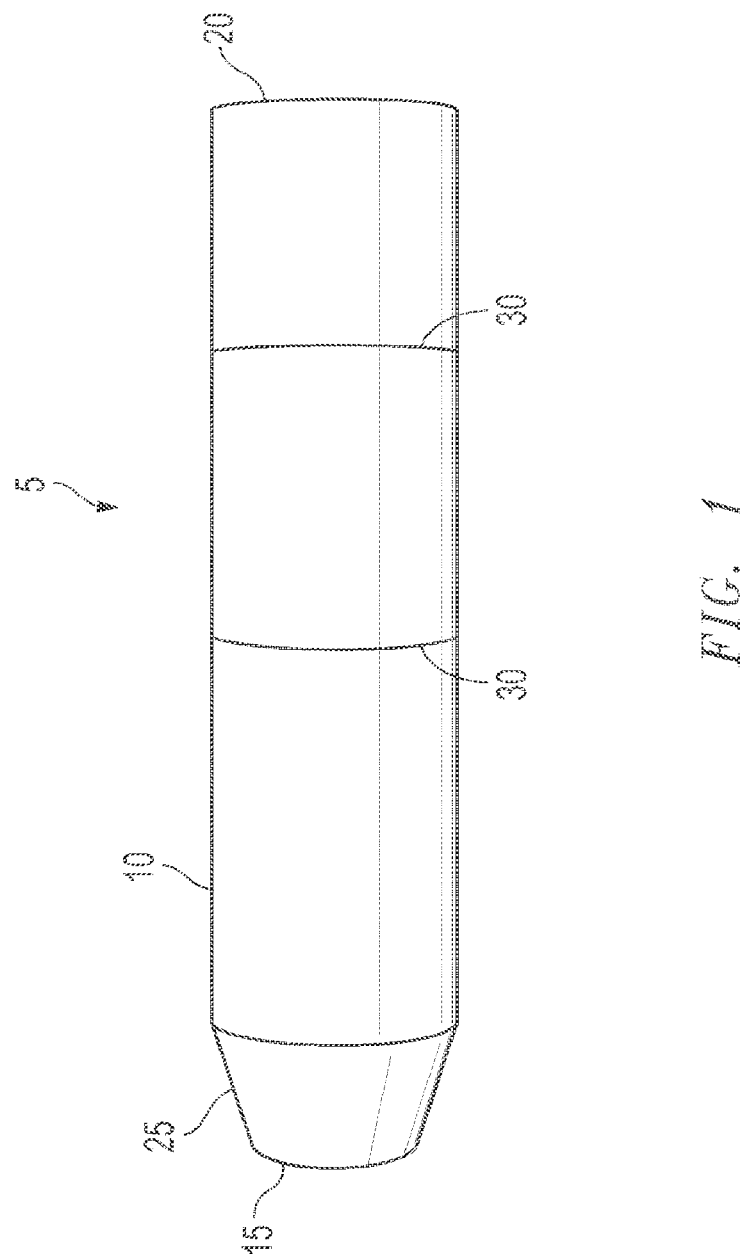
FIG. 1 illustrates a side view of a pulling head body according to an embodiment of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. It should be understood that any one of the features of the invention may be used separately or in combination with other features. Other systems, methods, features, and advantages of the invention will be or become apparent to one with skill in the art upon examination of the drawings and the detailed description. It is intended that all such additional systems, methods, features, and advantages be included within this description, be within the scope of the present invention, and be protected by the accompanying claims.

The present disclosure is described below with reference to the Figures in which various embodiments of the present invention are shown. For the purpose of clarification, embodiments described herein reference the term "cable," which refers to a pulling cable protruding from a "first end" of a pulling head body. Also, references are made to the term "wire," which refers to a wire product that is inserted into a "second end" of the pulling head body. In other words, the wire is the object which is pulled by the pulling cable via the pulling head body.

Figure 3:
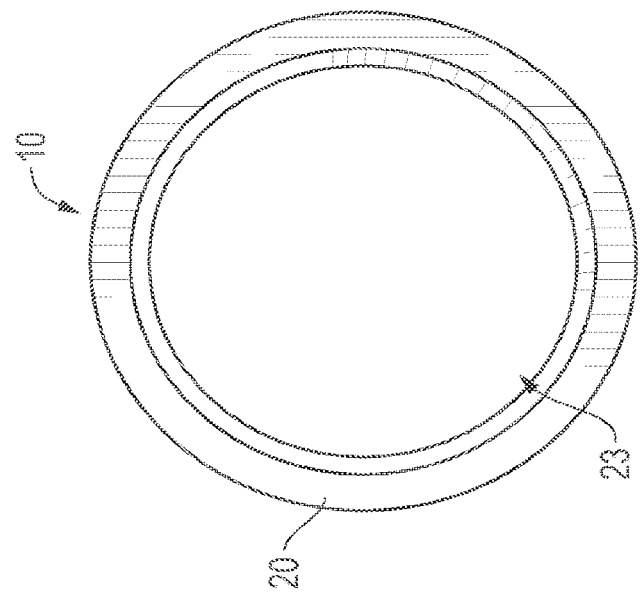
FIG. 3 illustrates a second end of the pulling head body according to an embodiment of the invention.
Figure 2:
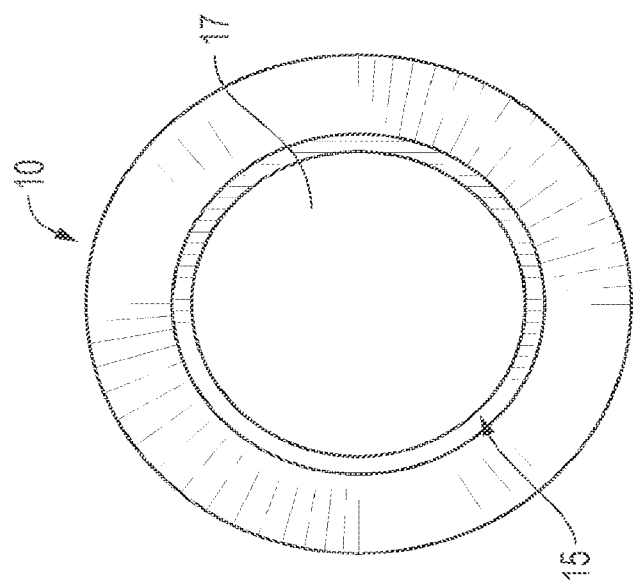
FIG. 2 illustrates a first end of a pulling head body according to an embodiment of the invention.
Figure 4:
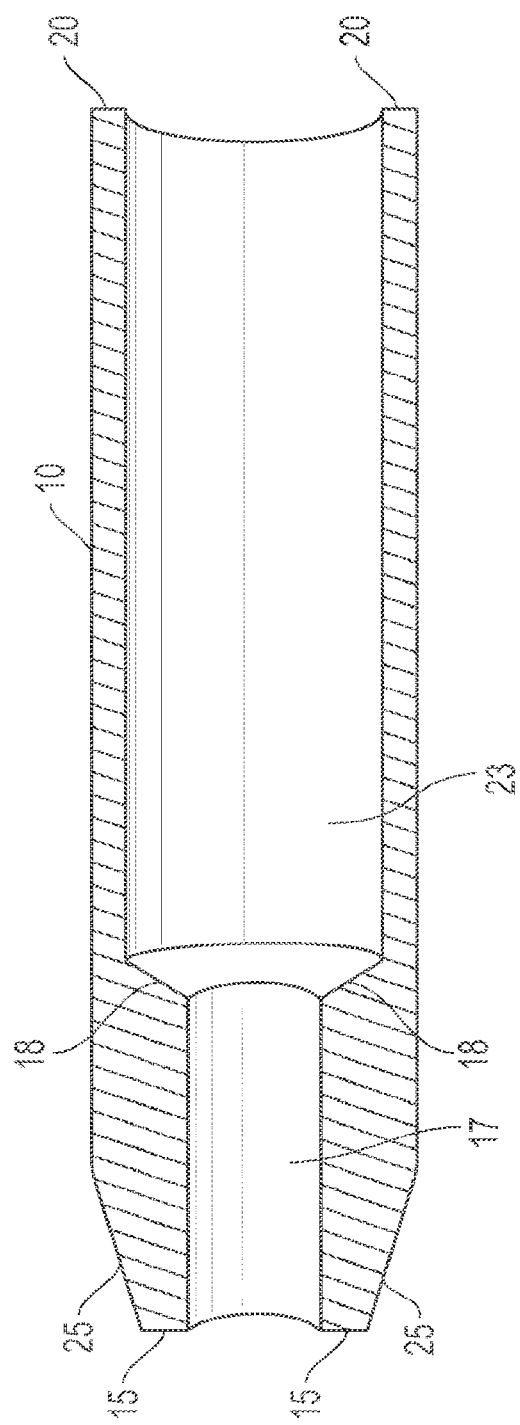
FIG. 4 illustrates a side sectional view of the pulling head body according to an embodiment of the invention.

Referring to FIGS. 1, 2, and 3 by way of non-limiting example, and consistent with embodiments of the invention, a pulling head body 5 is shown. The pulling head body 5 is manufactured such that it has a longitudinal, tubular shape, and has a substantially hollow two-part internal bore structure. As depicted in the drawings, the longitudinal axis of the pulling head body 5 runs between a first end 15 of the pulling head body 5 and a second end 20 of the pulling head body 5. The pulling head body 5 further comprises a tapered end 25 that begins on the outer surface 10 of the pulling head body 5 and tapers at an angle toward the first end 15. The pulling head body 5 further comprises a primary internal bore extending longitudinally between the first end 15 and second end 20 of the pulling head body 5. In a preferred embodiment, the primary internal bore is comprised of at least two different size inner diameter bores—a first end bore 17 and a second end bore 23. The first end bore 17 extends longitudinally from the first end 15 to the second end bore 23. The second end bore 23 is continuous with the first end bore 17, and terminates at the second end 20 of the pulling head body 5. The first end bore 17 is designed to easily receive common types and sizes of pulling cables 40 (Shown in FIG. 5). The second end bore 23 is designed to easily receive common types and sizes of wire 65 (Shown in FIG. 9).

In a preferred embodiment, the first end bore 17 is continuous with the second end bore 23 via a second tapered surface 18, which tapers outwardly from an end of the first end bore 17 into an end of the second end bore 23. In this way, the first end bore 17 and second end bore 23 are continuous, and the diameter of the first end bore 17 is smaller than the diameter of the second end bore 23. Furthermore, the second tapered surface 18 is tapered at an angle that can vary with the gauge of the wire 65. By way of a non-limiting example, for a 1000 kcmil gauge wire, the second tapered surface 18 can be designed to taper outwardly at an angle of approximately 120 degrees from the first end bore 17. The second tapered surface 18 operates to minimize movement of a ball swage 45 during wire pulling, which is discussed in more detail below.

The pulling head body 5 can be manufactured from aluminum, steel, or any other sufficiently strong and rigid material as one of skill in the art would contemplate for wire pulling uses. It is also understood that the length, first end bore 17 diameter, second end bore 23 diameter, and outer surface 10 diameter of the pulling head body 5 can vary, and can be manufactured to accommodate any size of pulling cable 40 or wire 65, depending on the size of wire to be pulled and needs of the operator.

Referring to FIG. 1, the outer surface 10 of the pulling head body 5 is further designed to include one or more crimp zone indicators 30. The crimp zone indicators 30 are disposed at predetermined strategic zones on the pulling head surface 10 of the pulling head body 5. In this way, the crimp zone indicators 30 indicate the approximate optimal position for crimping, such that when wire 65 is properly inserted into the pulling head body 5, a crimp substantially centered with respect to the crimp zone indicators 30 will achieve substantial contact between the pulling head body 5 and the wire 65.

The crimp zone indicators 30 can be flush with outer surface 10, etched into the exterior of the outer surface 10, or raised from the outer surface 10. For example, an etched or raised crimp zone indicator 30 could include, but is not limited to, notches, grooves, depressions, striations or ridges. Furthermore, the crimp zone indicators 30 can comprise various shapes and sizes. The crimp zone indicators 30 can also span the entire diameter of the pulling head body 5, or alternatively, can be positioned on one or more sides of the pulling head body 5. It is understood that the appearance, design or size of the crimp zone indicators 30 is not limited, so long as it is visible to the naked eye during operation, and so long as it identifies an approximate optimal crimping zone. In this way, the crimp zone indicators 30 provide for a consistent and accurate indicator for the area for which a crimp achieves substantial contact between the pulling head body 5 and the wire 65.

The position of the crimp zone indicators 30 is directly related to the gauge of the wire 65. As discussed above, the pulling head body 5 can be manufactured to a plurality of lengths, first end bore 17 diameters, second end bore 23 diameters, and other internal bore measurements and angles. The placement of the crimp zone indicators 30 are predetermined and disposed on the pulling head body 5 during its manufacturing process based upon the size of the end product pulling head body 5. Table 1 illustrates some examples of positions of crimp zone indicators 30. For example, for gauges of wire 65 less than or equal to 4/0 AWG, the first crimp zone indicator is placed approximately ¾" from the second end 20 of the pulling head body 5, and the second crimp zone indicator is placed approximately 1¾" from the second end 20 of the pulling head body 5. For wire 65 gauges between 250 kcmil and 400 kcmil, the first crimp zone indicator is placed approximately 1¼" from the second end 20 of the pulling head body 5, and the second crimp zone indicator is placed approximately 2½" from the second end 20 of the pulling head body 5. Finally, for wire 65 gauges between 500 kcmil and 1000 kcmil, the first crimp zone indicator is placed approximately 1¼" from the second end 20 of the pulling head body 5, and the second crimp zone indicator is placed approximately 2¾" from the second end 20 of the pulling head body 5.

TABLE 1

Illustrative Predetermined Positions of Crimp Zone Indicators

| Wire Gauge | Approximate Location of Crimp Zone Indicator 1 | Approximate Location of Crimp Zone Indicator 2 | # of Crimps at Location 1 | # of Crimps at Location 2 |
| --- | --- | --- | --- | --- |
| 6 AWG | ¾" | 1¾" | 1 crimp | 1 crimp |
| 4 AWG | ¾" | 1¾" | 1 crimp | 1 crimp |
| 3 AWG | ¾" | 1¾" | 1 crimp | 1 crimp |
| 2 AWG | ¾" | 1¾" | 1 crimp | 1 crimp |
| 1 AWG | ¾" | 1¾" | 1 crimp | 1 crimp |
| 1/0 AWG | ¾" | 1¾" | 1 crimp | 1 crimp |
| 2/0 AWG | ¾" | 1¾" | 1 crimp | 1 crimp |
| 3/0 AWG | ¾" | 1¾" | 1 crimp | 1 crimp |
| 4/0 AWG | ¾" | 1¾" | 1 crimp | 1 crimp |
| 250 kcmil | 1¼" | 2½" | 1 crimp | 1 crimp |
| 300 kcmil | 1¼" | 2½" | 1 crimp | 1 crimp |
| 350 kcmil | 1¼" | 2½" | 1 crimp | 1 crimp |
| 400 kcmil | 1¼" | 2½" | 1 crimp | 1 crimp |
| 500 kcmil | 1¼" | 2¾" | 2 crimps | 2 crimps |
| 600 kcmil | 1¼" | 2¾" | 2 crimps | 2 crimps |
| 750 kcmil | 1¼" | 2¾" | 2 crimps | 2 crimps |
| 1000 kcmil | 1¼" | 2¾" | 2 crimps | 2 crimps |

It is understood that the positions of the crimp zone indicators 30 indicated in Table 1 are merely illustrative, and do not limit the scope of the invention. A person of ordinary skill in the art would also understand that the positioning of the crimp zone indicators 30 has an acceptable degree of error. For example, for wire 65 gauges between 6 AWG and 4/0 AWG, the crimp zone indicators 30 can be positioned within an error of approximately ⅛". For wire 65 gauges between 250 kcmil and 1000 kcmil, the crimp zone indicators 30 can be positioned within an error of approximately ¼".

In an alternative embodiment, the crimp zone indicators 30 also indicate the location of a tapped surface within the exposed surface of the second end bore 23. After crimping, this tapped surface can provide for greater friction between the pulling head body 5 and the wire 65. The tapped surface can be textured, striated, ridged, furrowed or any other surface that would increase friction between the pulling head body 5 and the wire 65.

Figure 5:
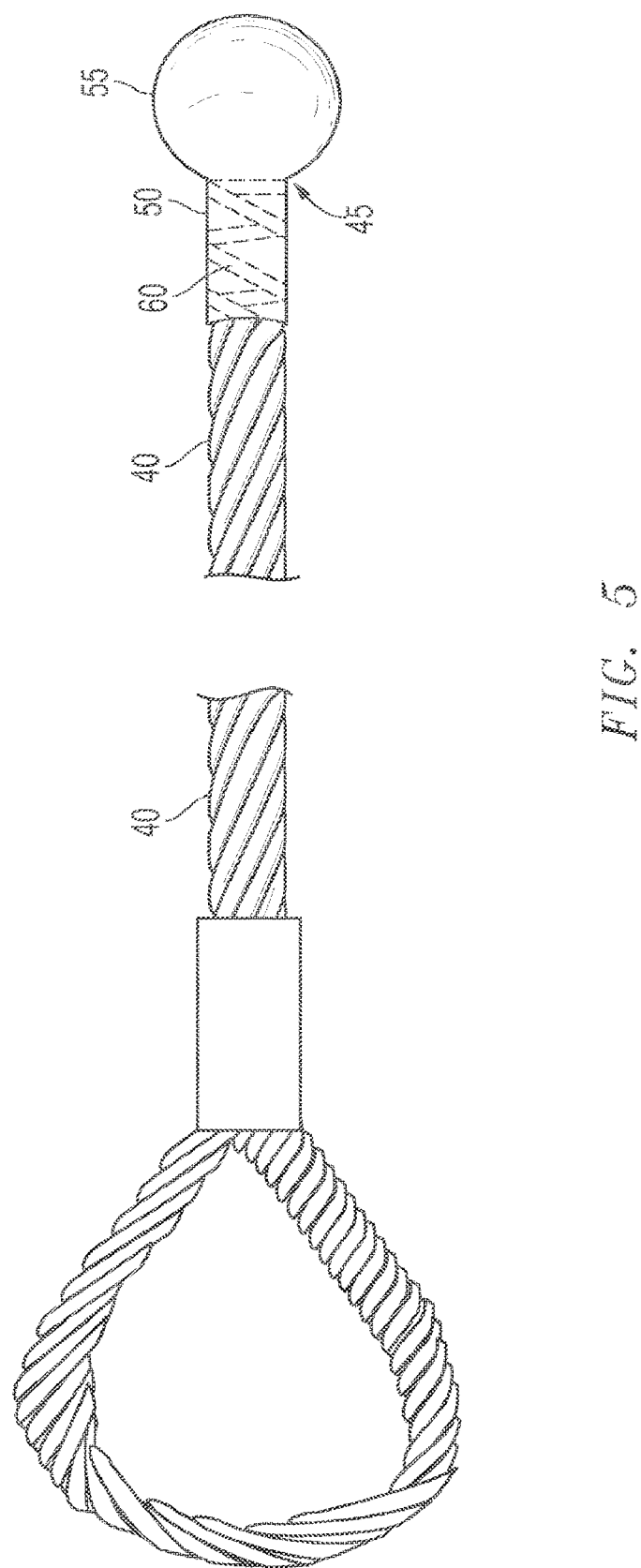
FIG. 5 illustrates a ball swage attached to an end of a pulling cable according to an embodiment of the invention.
Figure 6:
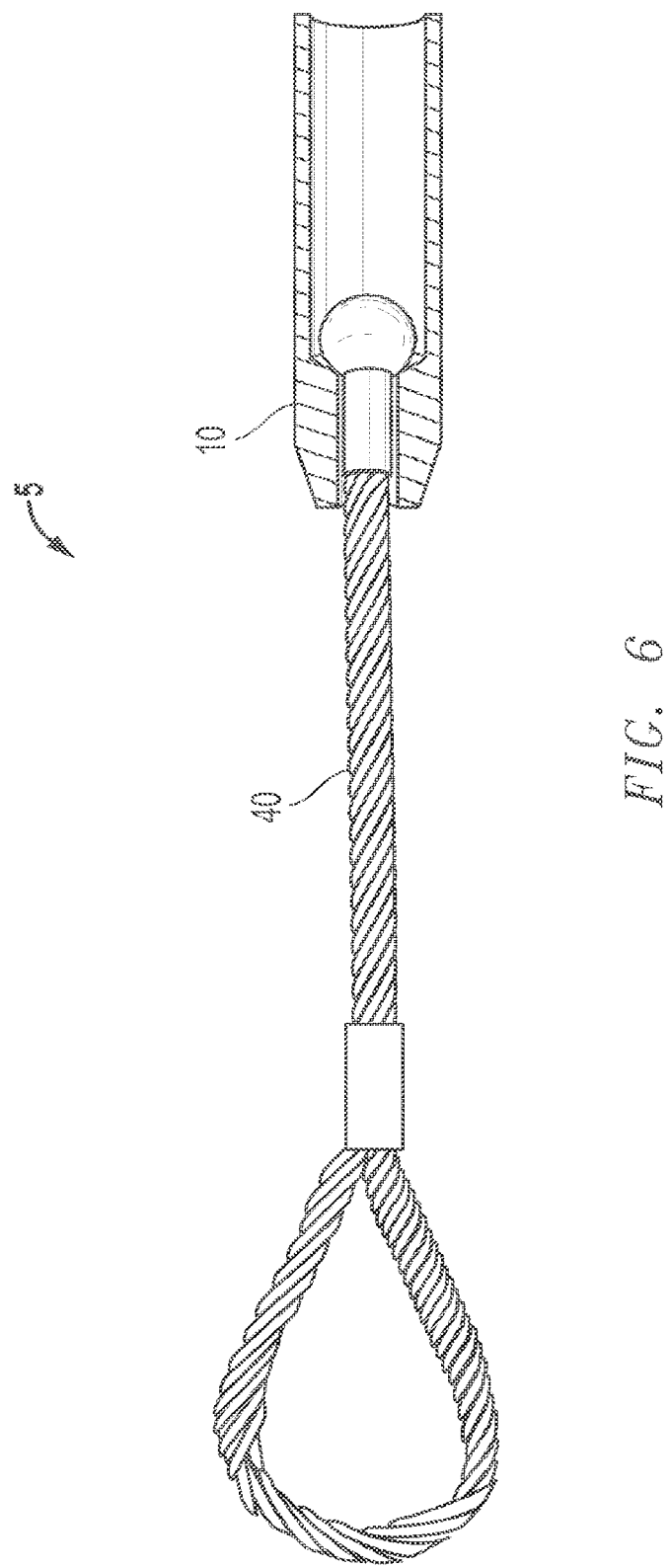
FIG. 6 illustrates a side sectional view of the pulling head body with ball swage attachment end of pulling cable operationally engaged according to an embodiment of the invention.
Figure 7:
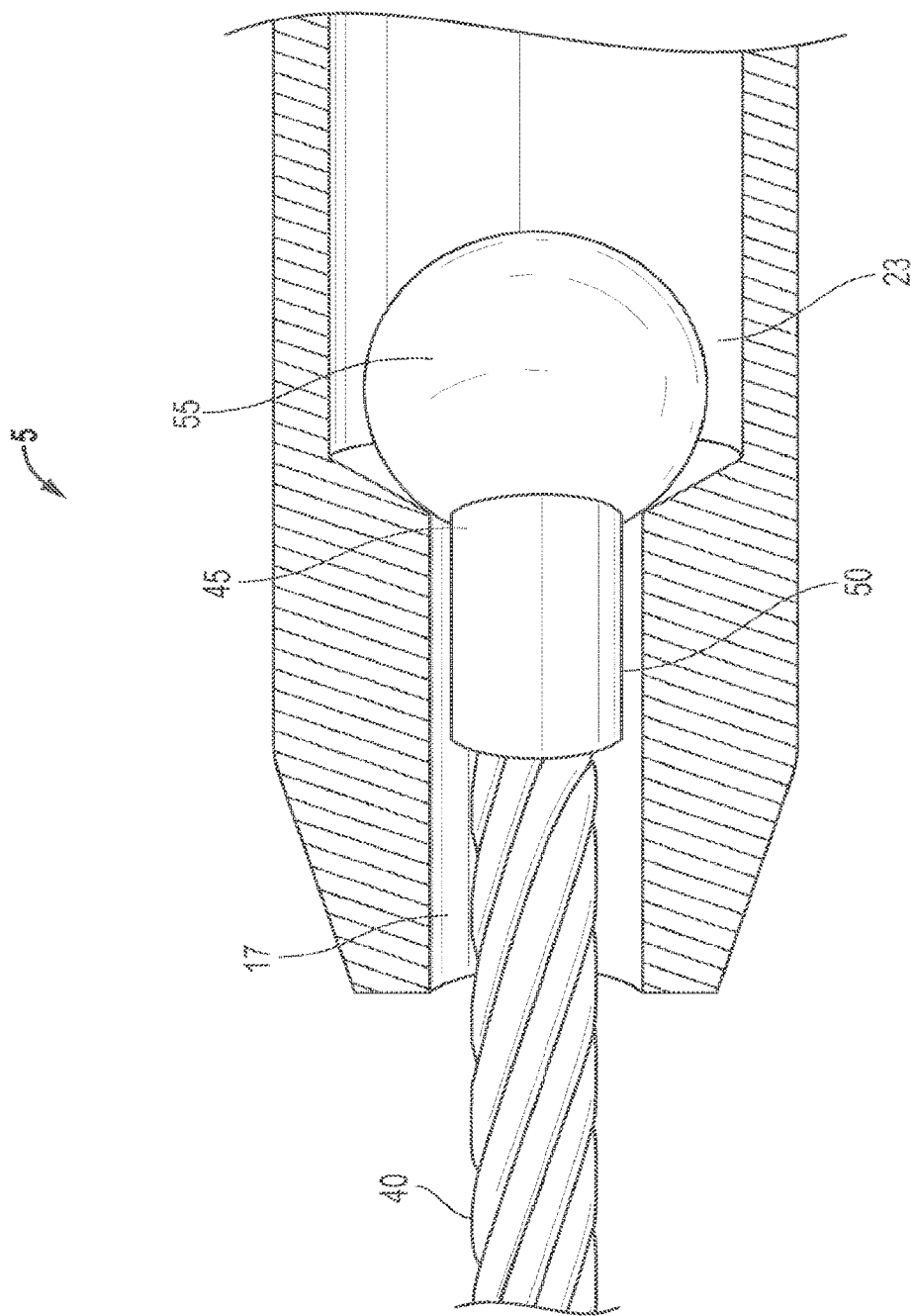
FIG. 7 illustrates a close-up side sectional view of the pulling head body with ball swage attachment end of pulling cable operationally engaged according to an embodiment of the invention.

Referring now to FIGS. 5, 6 and 7 by way of non-limiting example, and consistent with embodiments of the invention, a pulling cable 40 attached to a pulling head body 5 is shown. The pulling cable 40 is secured to the pulling head body 5 by engagement of a ball swage 45 with the pulling head body 5. Engagement of the ball swage 45 with the pulling head body 5 is more clearly depicted with reference to FIG. 7. The ball swage 45 is fixed to the pulling cable 40 via a neck 50, which is crimped against an attachment end of the pulling cable 40. The ball swage head 55 is engaged with the second tapered surface 18 within the second end bore 23. Due to its tapered angle, the design of the second tapered surface 18 functions to minimize movement of the ball swage 45 once it is engaged in the pulling head body 5 by application of a pulling tension on the pulling cable 40. The ball swage head 55 effectuates a stopping, engaging effect within the pulling head body 5 and prevents the pulling cable 40 from slipping through the first end bore 17 of the pulling head body 5. It is understood that the pulling cable 40, ball swage 55 or neck 50 can be manufactured from aluminum, steel, or any other sufficiently strong and rigid material as one of skill in the art would contemplate for wire pulling uses.

As depicted in FIG. 5, in one preferred embodiment, the exposed surface of the neck 50 is tapped to create further friction between the neck 50 and the end of the pulling cable 40. The tapped surface 60 can comprise a spiraling groove, or any other textured surface known in the art. The result is greater friction between the pulling cable 40 and ball swage 55 to further prevent the pulling cable 40 from detaching from the pulling head body 5 and wire 65.

Figure 8:
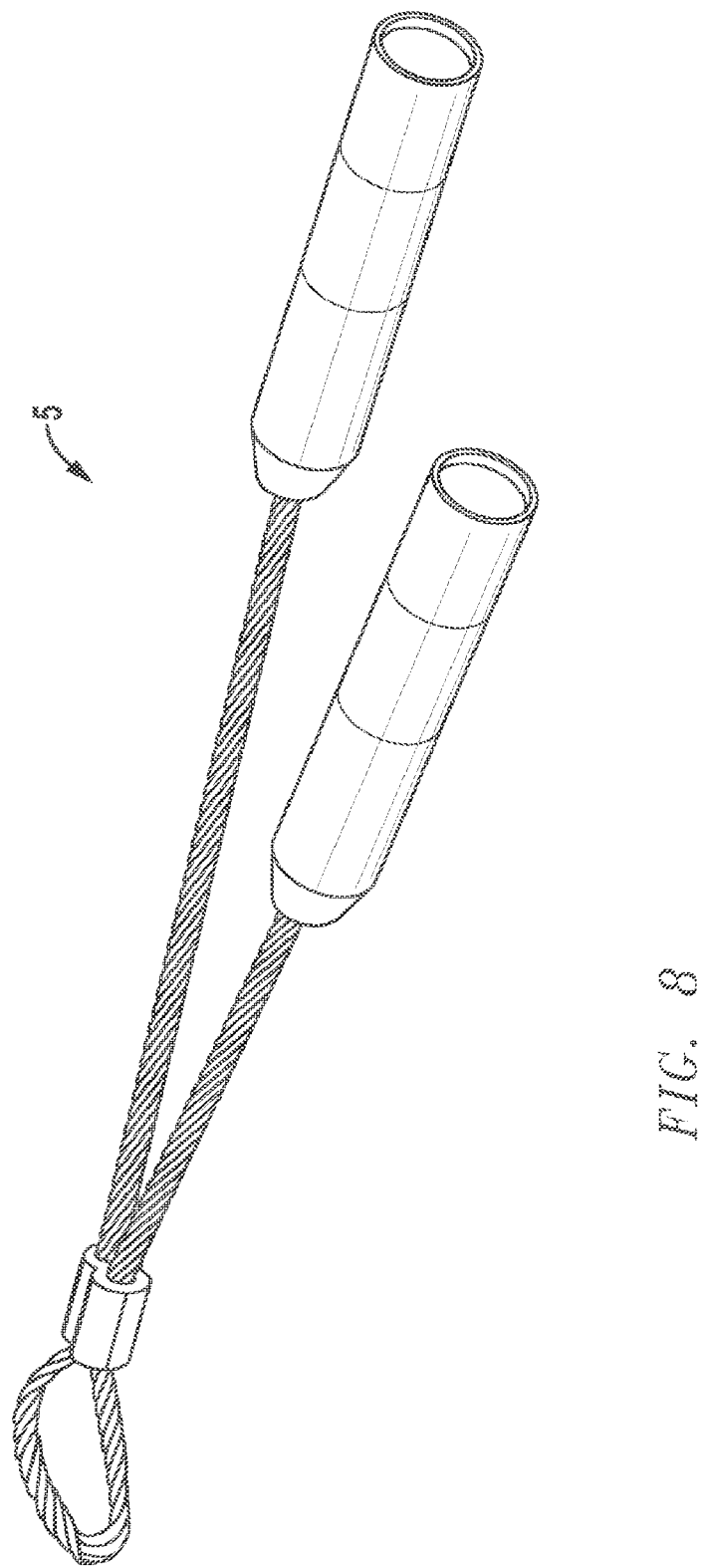
FIG. 8 illustrates two pulling head bodies attached to a split pulling cable according to an embodiment of the invention.

With reference to FIG. 8, it is also understood that a single pulling cable 40 can be split into one or more pulling cables for attachment to one or more wires 65 via one or more pulling head bodies 5. In this way, a single wire pull is capable of pulling multiple cables through the conduits of a building's infrastructure.

Figure 9:
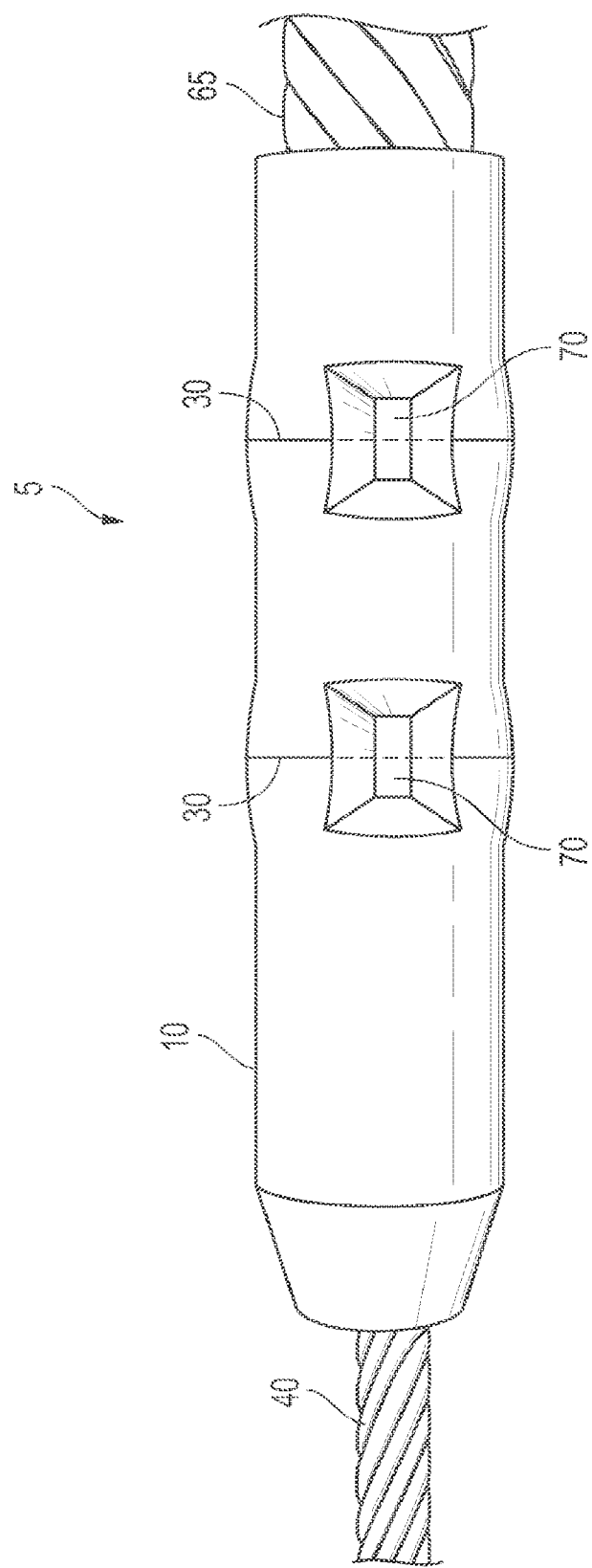
FIG. 9 illustrates a side view of the pulling head body with crimp dimples substantially centered with respect to crimp zone indicators on the outer surface of the pulling head body according to an embodiment of the invention.

Referring to FIG. 9, the crimp zone indicators 30 provide a recognizable and immediate sensory (i.e., via sight or feel) indication of a predetermined zone or area that is best suited for positioning of a crimping tool to engage, squeeze and form crimp dimples 70 on the pulling head body 5 for engaging an underlying wire 65. The crimp dimples 70, which can be formed by any crimping device having sufficient crimping force to exert, are substantially centered with respect to the crimp zone indicators 30. The dimples 70 created in one embodiment were created by using a hand-held eleven ton hydraulic press. It is understood that the crimping process has a zone of error that is acceptable with respect to placement of the crimp dimples 70.

In another embodiment of the invention, the size of the wire gauge determines the number of crimps required per crimp zone indicator 30. Referring to Table 1 by way of non-limiting examples, for wire gauges less than or equal to 400 kcmil, each crimp zone indicator receives one crimp on a side of the pulling head body 5. However, for wire gauges greater than 400 kcmil, each crimp zone indicator 30 receives two crimps. Thus, for example, a 500 kcmil pulling head body 5 having two crimp zone indicators 30 would comprise a total of four crimp dimples 70. Furthermore, two crimp dimples 70 on the same crimp zone indicator 30 are positioned 180 degrees apart.

Figure 10:
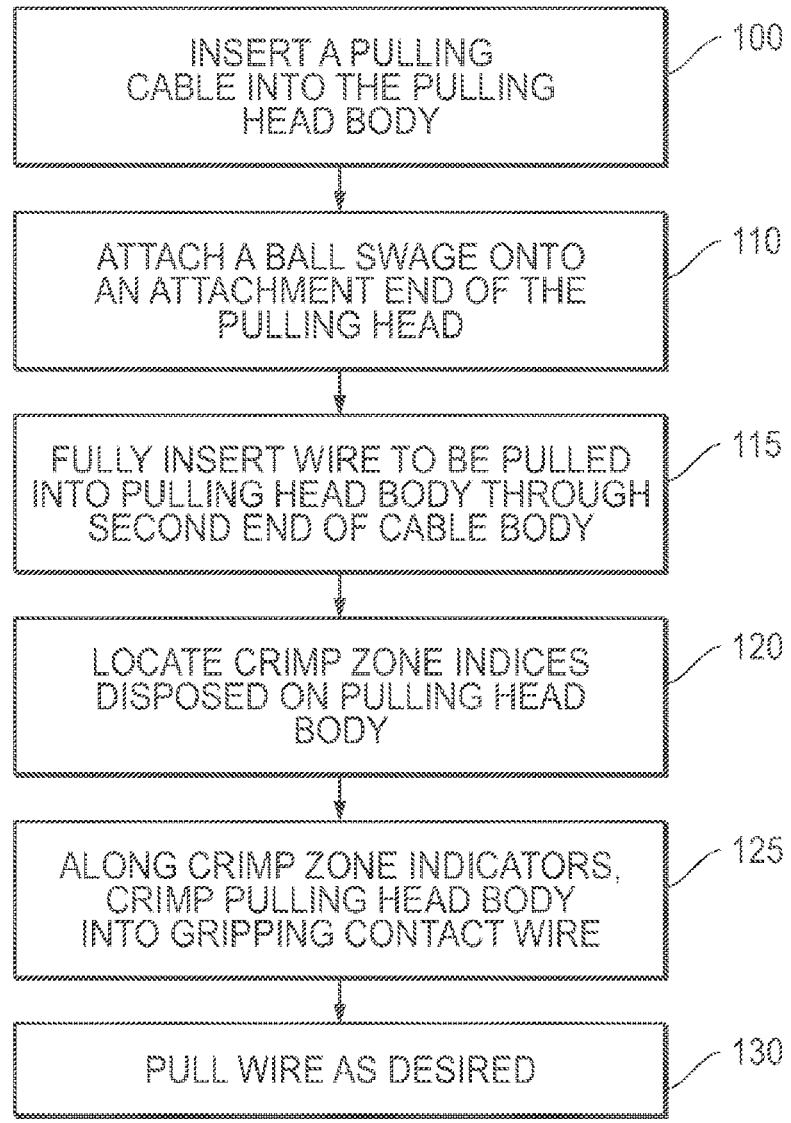
FIG. 10 is a graphical depiction of the wire pulling process utilizing the pulling head body with crimp zone indicators according to an embodiment of the invention.

Referring to FIG. 10 and by way of non-limiting example, and consistent with embodiments of the invention, a method for attaching a pulling head body 5 to a pulling cable 40 and wire 65 is illustrated. At step 100, a pulling cable 40 is inserted through the first end 15 and into the first end bore 17 of the pulling head body 5. At step 110, a ball swage 45 is crimped to the attachment end of the pulling cable 40, and a pulling tension is applied to the pulling cable 40 so that the ball swage head 55 engages with the second tapered surface 18 of the pulling head body 5. As such, the pulling cable 40 is fixed to the pulling head body 5. At step 115, a wire 65 is inserted into the second end 20 and through the second end bore 23 until the wire 65 is fully inserted into the pulling head body 5 and in contact with the ball swage head 55. At step 120, the operator visually locates the one or more crimp zone indicators 30 on the outer surface 10 of the pulling head body 5. At step 125, the operator uses a hydraulic crimping device to crimp the pulling head body 5 against the wire 65 at approximately the crimp zone indicators 30 so that the resulting crimp zone dimples 70 are substantially centered with respect to the crimp zone indicators 30. Once the wire 65 is secured within the pulling head body 5, the wire can be pulled as desired through the building's infrastructure, as recited in step 130.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. A pulling head body for pulling wire, the pulling head body comprising:
   a bore extending along the pulling head body;
   wherein a pulling cable is inserted into the bore; and
   wherein the pulling cable is secured to the pulling head body via a tapped ball swage neck.

2. The pulling head body of claim 1 further comprising one or more crimp zone indicators, wherein the crimp zone indicators are positioned on an outer surface of the tapped ball swage neck.

3. The pulling head body of claim 1, wherein the tapped ball swage neck provides friction between the tapped ball swag neck and the pulling cable.

4. The pulling head body of claim 3, wherein the tapped ball swage neck is a textured tapped ball swag neck.

5. The pulling head body of claim 3, wherein the tapped ball swage neck is a striated tapped ball swag neck.

6. The pulling head body of claim 3, wherein the tapped ball swage neck is a ridged tapped ball swag neck.

7. The pulling head body of claim 3, wherein the tapped ball swage neck is a furrowed tapped ball swag neck.

8. The pulling head body of claim 3, wherein the tapped ball swage neck prevents the detachment of the pulling wire from the tapped ball swag neck.

9. The pulling head body of claim 1, wherein the tapped ball swage neck is crimped to an end of the pulling cable.

10. The pulling head body of claim 9, wherein the tapped ball swage neck comprises indicators for the location of a tapped surface.

11. The pulling head body of claim 1, wherein the tapped ball swage neck is a spiral groove tapped ball swage neck.

12. A ball swage pulling system, the ball swage pulling system comprising:
    at least one pulling cable, the at least one pulling cable having a pulling end and an attachment end; and
    at least one pulling head body, the at least one pulling head body comprising a bore extending along the at least one pulling head body;
    wherein the at least one pulling cable is inserted into the bore of the at least one pulling head body; and
    wherein the at least one pulling cable is secured to the at least one pulling head body via a tapped ball swage neck.

13. The ball swage pulling system of claim 12, wherein the at least one pulling cable comprises at least two pulling cables.

14. The ball swage pulling system of claim 13, wherein the at least one pulling head body comprises at least two pulling head bodies.

15. The ball swage pulling system of claim 14, wherein a first pulling cable is inserted into the bore of the first pulling head body and the second pulling cable is inserted into the bore of the second pulling head body.

16. The ball swage pulling system of claim 15, wherein the first pulling cable is secured to a first pulling head body via the first tapped ball swage neck and wherein the second pulling cable is secured to a second pulling head body via the second tapped ball swage neck.

17. The ball swage pulling system of claim 16, wherein the first and second tapped ball swage necks comprise crimp zone indicators.

18. The ball swage pulling system of claim 13, wherein the first pulling cable is secured to the second pulling cable.

19. The ball swage pulling system of claim 18, wherein the first and second pulling cables form a loop.

20. The pulling head body of claim 12, wherein the tapped ball swage neck provides friction between the tapped ball swag neck and the at least one pulling cable.

* * * * *